Patented Sept. 20, 1938

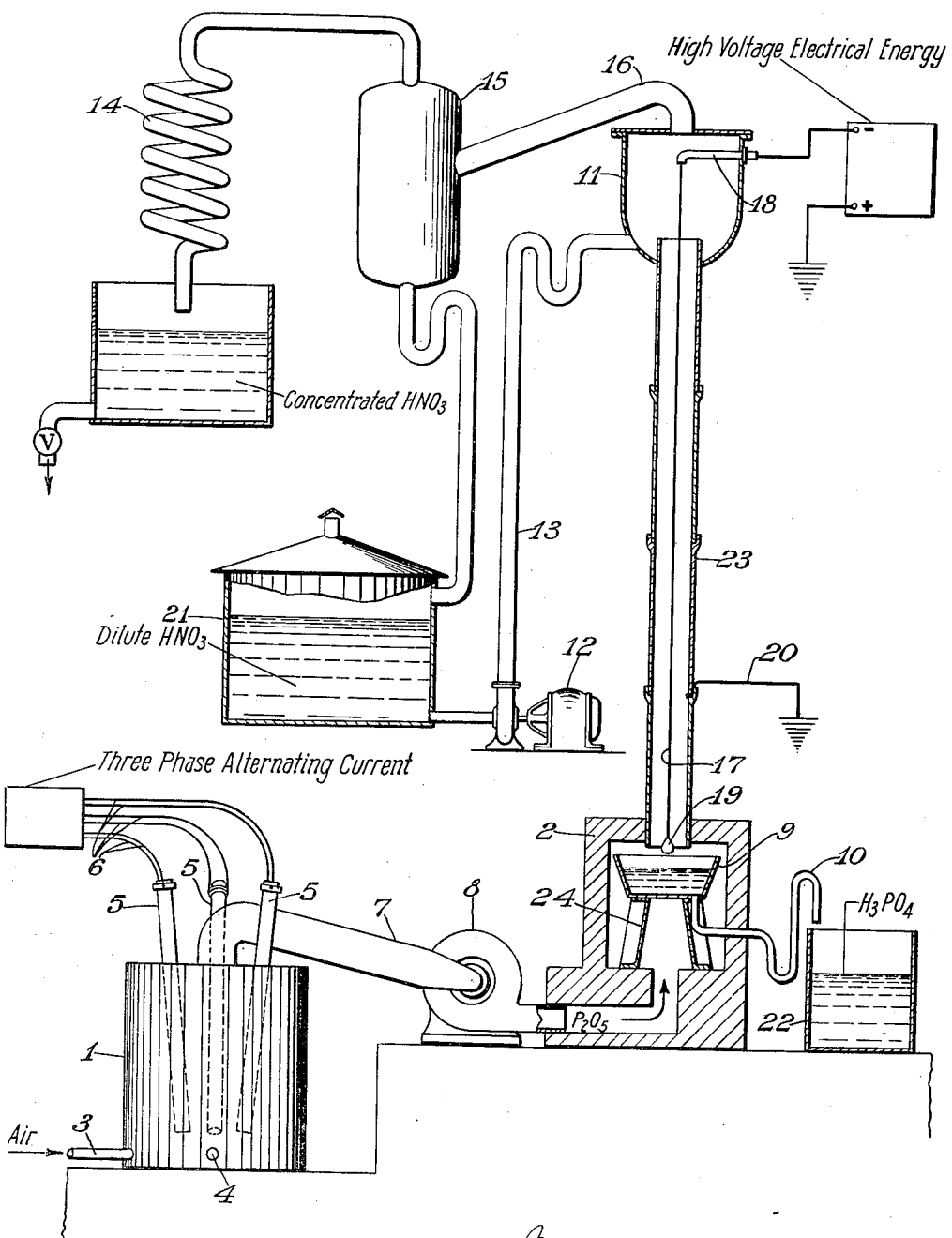

2,130,483

UNITED STATES PATENT OFFICE 2,130,483

PRODUCTION OF PHOSPHORIC ACID AND CONCENTRATED NITRIC ACID

Benton A. Bull, Wilmington, Del., assignor to E. I. du Pont de Nemours & Company, Wilmington, Del., a corporation of Delaware Application October 23, 1935, Serial No. 46,245

4 Claims. (Cl. 23—160)

The present invention relates to the production of phosphoric acid, and more particularly to a new and improved process for producing orthophosphoric acid from phosphorus pentoxide.

As is well known, phosphoric acid is manufactured annually in large quantities by two general methods. The older of these methods involves a double decomposition between rock phosphate and sulfuric acid. The more modern method comprises the absorption of phosphoric anhydride in water, the $P_2O_5$ usually being obtained by the so-called volatilization process which employs an electric furnace.

The reaction between phosphoric anhydride and water is capable of producing the meta- and pyro-phosphoric acids, as well as the ortho-acid, as indicated in the following diagram:—

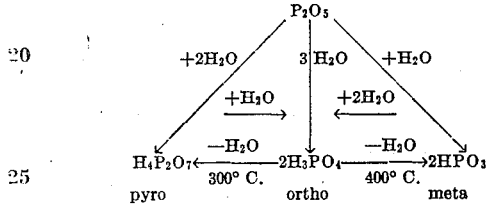

Thus, for example, when phosphoric anhydride is absorbed in a small amount of water, the meta-acid is produced. This may be converted to the ortho-acid by allowing the solution to stand, or by boiling in the presence of nitric acid, which catalyzes the transformation. The ortho-acid is obtained directly from $P_2O_5$ by absorption in a large volume of water. The ortho-acid may be converted into the meta-acid by heating at about 400° C., and into the pyro-acid by heating at about 300° C.

From the foregoing, it is apparent that close chemical control is necessary to obtain a chemically pure product, and that where the ortho-acid is desired, the presence of nitric acid has a desirable catalytic effect.

The methods heretofore employed in the manufacture of orthophosphoric acid by the volatilization process have been greatly improved and refined within the past decade, but as far as known, no satisfactory economic use has been made of the relatively enormous quantities of heat liberated when water reacts with phosphoric anhydride. Indeed, cooling means are generally provided in order to dissipate the heat generated. In addition, the valuable dehydrating power of phosphoric anhydride has heretofore been lost or wasted by absorbing this powerful drying agent in water.

The object of the present invention is a more rational method of producing phosphoric acid from phosphorus pentoxide. A further object is a process of the character described, wherein both the dehydrating power of phosphoric anhydride and its heat of reaction with water are utilized. A still further object is a unitary process for simultaneously producing phosphoric acid and concentrated nitric acid. Other objects will be apparent as the invention is hereinafter more fully described.

I have found that these objects may be accomplished by reacting phosphorus pentoxide with a dilute aqueous solution of a substance which is inert with respect to $P_2O_5$ or $H_3PO_4$, and which is desirably concentrated or dehydrated by distillation from a non-volatile dehydrating agent, such as phosphoric acid. Thus, for example, these objects are accomplished by absorbing phosphorus pentoxide in dilute nitric acid which, as mentioned above, catalyzes the formation of orthophosphoric acid. In this case the water required for the formation of phosphoric acid is furnished as the undesirable diluent of nitric acid, and the great heat of reaction of phosphorus pentoxide with water is employed in distilling the nitric acid from the resultant mixture. Expressed in more general terms, the water required for phosphoric anhydride is supplied from an aqueous solution which is desirably dehydrated, and the heat required to volatilize the solute of the aqueous solution is supplied by an exothermic reaction which is desirably cooled. By this integration of processes, the concentration and distillation of the solute (nitric acid) is accomplished at the same time that phosphoric acid is being manufactured. Greatly increased efficiency therefore results, thereby decreasing the production costs of both phosphoric acid and concentrated nitric acid.

In order to describe my invention more clearly, I shall refer to the attached drawing which illustrates the preferred embodiment thereof. It is to be understood, however, that this is done solely by way of illustration and is therefore not to be regarded as a limitation upon the scope of my invention.

Referring to the drawing, the apparatus comprises an electric furnace 1 of usual construction in combination with a dehydrating and distilling tower 2. The furnace 1 is of any desired construction and may consist, for example, of an iron cylinder lined with fire brick and provided with a compressed air inlet 3, a slag outlet 4 and three carbon electrodes 5. These electrodes are connected through the conductor 6 to a suitable source of three-phase alternating current such as is commonly employed in this type of apparatus.

The vapor conduit 7 of the furnace 1 is connected to a fan or blower 8 constructed of suitable corrosion-resistant metal. The fan 8 draws the $P_2O_5$ produced in the furnace 1 through the conduit 7 and forces it into the base of the dehydrating and distilling tower 2, which comprises at least one substantially vertical column 23, down the inner surface of which the acid flows in a condition of high surface exposure, for example, as a continuous film.

The column 23 is constructed of lengths of acid-proof terra cotta pipe carefully sealed together at the joints. At the base of the tower 2 an earthenware receiver 9, provided with a trapped delivery tube 10, serves to collect the material which passes through the length of the column 23. The receiver 9 is held in position beneath the column 23 by any suitable means, for example, the supports 24.

The top of the column 23 is provided with a distributor 11 which is supplied with dilute nitric acid from the supply tank 21 by means of the feed pump 12 and the trapped feed line 13. The vapor exit line 16 of the distributor 11 is connected to the condensing system 14 through the entrainment separator 15.

A corrosion-resistant wire 17 carrying a heavy metal weight or bob 19 at the lower end thereof is suspended in the column 23 from the insulating support 18, the bob 19 being attached to prevent the wire contacting the film of acid flowing down over the inner surface of the column 23. This wire 17 which acts as the active electrode is connected to the negative side of a suitable source of electric energy as is usual with known types of electrical precipitating devices. The positive side of the current supply is earthed. The film of acid on the inner surface of the column 23 is also earthed through the grounded wire 20, the end of which extends through the wall of the column 23 and contacts the falling film of acid, which serves as the passive electrode.

In operation, a suitable charge of rock phosphate, silica and carbon, for example, is placed in the furnace 1, and the current applied to the electrodes 5. Air is admitted at the base of the furnace through the line 3. The $P_2O_5$ produced in the furnace is drawn through the conduit 7 by means of the blower 8, and forced into the base of the dehydrating and distilling tower 2. Simultaneously, dilute nitric acid, either alone or mixed with dilute phosphoric acid if desired, is forced by means of the pump 12 from the supply tank 21 into the distributor 11 through the trapped line 13. The acid overflows the top of the column 23 and forms a continuous film flowing down over the inner surface of said column and, contacting the grounded wire 20, acts as the passive electrode. As the $P_2O_5$ ascends in the column 23 the potential between the negatively charged wire 17 and the earthed film precipitates the $P_2O_5$ on the film of the acid.

The temperature of the $P_2O_5$ entering the base of the tower 2 is between 100 and 175° C. The heat content of the gas is absorbed by the counter-current of dilute acid, a portion of the nitric acid being vaporized by the heat absorbed. The additional heat required to vaporize the remainder of the nitric acid, and the dehydrating effect, is produced by the reaction of the precipitated $P_2O_5$ with the water present in the dilute acid or acids.

The vaporized nitric acid ascends through the column 23 into the distributor 11, thence into the entrainment separator 15, and finally into the condensing system 14. The precipitated $P_2O_5$ reacts with the water in the dilute acid to produce orthophosphoric acid which flows down the column 23 and drops into the earthenware receiver 9, whence it flows through the delivery tube 10 into the storage tank 22.

The concentration of phosphoric acid produced will, of course, depend on the relative rates of flow and concentrations of the nitric acid and the $P_2O_5$. By control of these factors, it is possible to obtain concentrated nitric acid and phosphoric acid in excellent yields with high thermal efficiency.

While I have illustrated my invention in detail with reference to the concentration of dilute nitric acid, it is apparent that similar advantages will result from the integration of the manufacture of phosphoric acid with processes other than that hereinbefore specifically described. Thus, other materials than nitric acid may be dehydrated and distilled in a similar manner. For example, the phosphoric anhydride may be absorbed in aqueous solutions of bromine from which it is desired to remove the water. Again, aqueous solutions of gases such as hydrogen bromide, or hydrogen chloride may be treated in a similar manner whereby the dry gases will be expelled. Further, other substances such as wet benzene or wet paraffin hydrocarbons may be distilled and dried at the same time. In fact, the process may be employed wherever it is desired to concentrate a substance dissolved in water or in which water is dissolved. The only purely chemical limitations are that the substance must be inert with respect to phosphoric anhydride and the corresponding acid, and easily separable therefrom. I prefer to employ the process, however, in conjunction with the concentration of nitric acid since large quantities of this material are required annually, thereby assuring a ready market for both products of the process. In addition, nitric acid catalyzes the formation of orthophosphoric acid, for which reason it is especially advantageous.

In the foregoing detailed description of my process it is apparent that many variations can be made without departing from the spirit or scope of my invention. Thus, for example, the phosphoric anhydride may be produced by other means than by the volatilization process disclosed, as for example, by the burning of yellow phosphorus. Again, other suitable dehydrating and distilling columns may be employed if desired. Many other variations in the process as disclosed will be apparent to those skilled in the art. I therefore intend to be limited only in accordance with the following patent claims.

I claim:

1. The process of concentrating nitric acid, which process comprises causing dilute, aqueous nitric acid to flow in a condition of high surface exposure countercurrent to vaporized phosphorus pentoxide, electrically precipitating said phosphorus pentoxide in said dilute nitric acid and removing the nitric acid vaporized in a substantially dehydrated condition by the heat liberated in the reaction between phosphorus pentoxide and the water in said dilute nitric acid, and subsequently condensing said vapors whereby to produce highly concentrated nitric acid.

2. The process of producing highly concentrated nitric acid, which process comprises causing dilute, aqueous nitric acid to flow in a condition of high surface exposure countercurrent to a stream of phosphorus pentoxide in the vapor state, electrically precipitating said phosphorus pentoxide in said nitric acid, whereby to effect the removal of water therefrom, separating the entrained mist from the nitric acid which is volatilized by the heat liberated in the reaction between phosphorus pentoxide and the water in said dilute nitric acid, and condensing said nitric acid whereby to produce highly concentrated nitric acid.

3. The process of claim 2, wherein said phosphorus pentoxide is supplied to said countercurrent flow of nitric acid, in an amount sufficient to distill said nitric acid in a substantially dehydrated condition from the phosphoric acid produced by the interaction of said phosphorus pentoxide and the water in said dilute, aqueous nitric acid.

4. The process of claim 2, wherein said nitric acid is caused to flow in the form of a continuously moving film down over the inner surface of a substantially vertical, acid-resistant tube.

BENTON A. BULL.